United States Patent
Dalcher et al.

(10) Patent No.: US 10,032,024 B2
(45) Date of Patent: Jul. 24, 2018

(54) SYSTEM AND METHOD FOR VIRTUAL PARTITION MONITORING

(71) Applicant: McAfee, LLC, Plano, TX (US)

(72) Inventors: Gregory W. Dalcher, Tigard, OR (US); Jonathan L. Edwards, Portland, OR (US)

(73) Assignee: McAfee, LLC, Plano, TX (US)

( * ) Notice: Subject to any disclaimer, the term of this patent is extended or adjusted under 35 U.S.C. 154(b) by 37 days.

(21) Appl. No.: 15/082,060

(22) Filed: Mar. 28, 2016

(65) Prior Publication Data

US 2016/0224792 A1 Aug. 4, 2016

Related U.S. Application Data

(63) Continuation of application No. 13/155,572, filed on Jun. 8, 2011, now Pat. No. 92,989,108.

(51) Int. Cl.
*G06F 21/56* (2013.01)
*G06F 21/55* (2013.01)
(Continued)

(52) U.S. Cl.
CPC ........ *G06F 21/566* (2013.01); *G06F 9/45558* (2013.01); *G06F 21/53* (2013.01);
(Continued)

(58) Field of Classification Search
CPC ...... G06F 21/566; G06F 21/53; G06F 21/554; G06F 21/577; G06F 21/6218;
(Continued)

(56) References Cited

U.S. PATENT DOCUMENTS 5,987,610 A 11/1999 Franczek et al.
6,073,142 A 6/2000 Geiger et al.
(Continued)

FOREIGN PATENT DOCUMENTS

CN 101853175 A 10/2010
EP 2 737 395 6/2014
(Continued)

OTHER PUBLICATIONS

"Linux/Unix Command: chroot," About.com: Focus on Linus, About.com, Inc., 2007, http://linus.about.com/library/cmd/blcndl2.chroot.html.
(Continued)

*Primary Examiner* — Theodore C Parsons
*Assistant Examiner* — Carlos M De Jesus Lassala
(74) *Attorney, Agent, or Firm* — Patent Capital Group (57) ABSTRACT

A method is provided in one example embodiment that includes receiving in an external handler an event notification associated with an event in a virtual partition. A thread in the process in the virtual partition that caused the event can be parked. Other threads and processes may be allowed to resume while a security handler evaluates the event for potential threats. A helper agent within the virtual partition may be instructed to execute a task, such as collecting and assembling event context within the virtual partition, and results based on the task can be returned to the external handler. A policy action can be taken based on the results returned by the helper agent, which may include, for example, instructing the helper agent to terminate the process that caused the event.

24 Claims, 3 Drawing Sheets

(51) Int. Cl.
  *G06F 21/53* (2013.01)
  *G06F 9/455* (2018.01)
  *G06F 21/57* (2013.01)
  *G06F 21/62* (2013.01)

(52) U.S. Cl.
  CPC .......... *G06F 21/554* (2013.01); *G06F 21/577* (2013.01); *G06F 21/6218* (2013.01); *G06F 2009/45587* (2013.01); *G06F 2009/45591* (2013.01)

(58) Field of Classification Search
  CPC ....... G06F 9/45558; G06F 2009/45587; G06F 2009/45591; G06F 21/54; G06F 21/556
  See application file for complete search history.

(56) References Cited

U.S. PATENT DOCUMENTS

| | | | |
|---|---|---|---|
| 6,075,938 | A | 6/2000 | Bugnion et al. |
| 6,363,421 | B2 | 3/2002 | Barker et al. |
| 6,460,050 | B1 | 10/2002 | Pace et al. |
| 6,684,329 | B1 | 1/2004 | Epstein et al. |
| 6,691,113 | B1 | 2/2004 | Harrison et al. |
| 6,986,052 | B1 | 1/2006 | Mittal |
| 7,356,679 | B1 | 4/2008 | Le et al. |
| 7,496,727 | B1 | 2/2009 | Ludloff et al. |
| 7,506,155 | B1 | 3/2009 | Stewart et al. |
| 7,845,009 | B2 | 11/2010 | Grobman |
| 8,352,939 | B1 | 1/2013 | Edwards et al. |
| 8,561,204 | B1 | 10/2013 | Dalcher |
| 9,298,910 | B2 | 3/2016 | Dalcher et al. |
| 9,311,126 | B2 | 4/2016 | Edwards et al. |
| 2001/0037450 | A1 | 11/2001 | Metitski et al. |
| 2002/0073316 | A1 | 6/2002 | Collins et al. |
| 2002/0162024 | A1 | 10/2002 | Cunchon et al. |
| 2002/0178271 | A1 | 11/2002 | Graham et al. |
| 2004/0117658 | A1 | 6/2004 | Klaes |
| 2004/0158730 | A1 | 8/2004 | Sarkar |
| 2004/0230972 | A1 | 11/2004 | Donovan et al. |
| 2005/0091486 | A1 | 4/2005 | Avraham et al. |
| 2005/0091516 | A1 | 4/2005 | McDermott |
| 2005/0188210 | A1 | 8/2005 | Perlin et al. |
| 2006/0021032 | A1 | 1/2006 | Challener et al. |
| 2006/0026569 | A1 | 2/2006 | Oerting et al. |
| 2006/0089984 | A1* | 4/2006 | Chagoly ............... G06F 11/302 709/224 |
| 2006/0090084 | A1 | 4/2006 | Buer |
| 2006/0161727 | A1* | 7/2006 | Surico ................ G06F 12/0246 711/103 |
| 2006/0206892 | A1 | 9/2006 | Vega et al. |
| 2006/0236127 | A1 | 10/2006 | Kurien et al. |
| 2006/0284632 | A1 | 12/2006 | Braverman et al. |
| 2007/0011736 | A1 | 1/2007 | Kalibjian et al. |
| 2007/0074192 | A1 | 3/2007 | Geisinger |
| 2007/0106986 | A1 | 5/2007 | Worley |
| 2007/0150886 | A1 | 6/2007 | Shapiro |
| 2007/0180509 | A1 | 8/2007 | Swartz et al. |
| 2007/0271610 | A1* | 11/2007 | Grobman ............... G06F 21/53 726/22 |
| 2008/0028052 | A1 | 1/2008 | Currid et al. |
| 2008/0109903 | A1 | 5/2008 | Werner et al. |
| 2008/0134175 | A1 | 6/2008 | Fitzgerald et al. |
| 2008/0134176 | A1 | 6/2008 | Fitzgerald et al. |
| 2008/0134177 | A1 | 6/2008 | Fitzgerald et al. |
| 2008/0134178 | A1 | 6/2008 | Fitzgerald et al. |
| 2008/0184225 | A1 | 7/2008 | Fitzgerald et al. |
| 2008/0184373 | A1 | 7/2008 | Traut et al. |
| 2008/0244579 | A1 | 10/2008 | Muller |
| 2008/0256536 | A1 | 10/2008 | Zhao et al. |
| 2008/0271019 | A1 | 10/2008 | Stratton et al. |
| 2008/0307414 | A1 | 12/2008 | Alpern et al. |
| 2009/0007100 | A1* | 1/2009 | Field ................... G06F 21/53 718/1 |
| 2009/0007105 | A1 | 1/2009 | Fries et al. |
| 2009/0044024 | A1 | 2/2009 | Oberheide et al. |
| 2009/0158432 | A1 | 6/2009 | Zheng et al. |
| 2009/0241109 | A1 | 9/2009 | Vandegrift et al. |
| 2009/0288167 | A1* | 11/2009 | Freericks ............... G06F 21/54 726/23 |
| 2009/0327576 | A1 | 12/2009 | Oshins |
| 2010/0205669 | A1 | 8/2010 | Mantripragada et al. |
| 2010/0235836 | A1 | 9/2010 | Bratanov |
| 2010/0251238 | A1 | 9/2010 | Schuba et al. |
| 2010/0281273 | A1 | 11/2010 | Lee et al. |
| 2010/0306764 | A1 | 12/2010 | Khanna |
| 2010/0306769 | A1 | 12/2010 | Schneider |
| 2011/0145806 | A1* | 6/2011 | Cook ..................... G06F 8/67 717/170 |
| 2011/0167472 | A1 | 7/2011 | Evans et al. |
| 2011/0167494 | A1 | 7/2011 | Bowen et al. |
| 2012/0255011 | A1 | 10/2012 | Sallam |
| 2013/0031291 | A1 | 1/2013 | Edwards et al. |

FOREIGN PATENT DOCUMENTS

| | | |
|---|---|---|
| JP | 2002-201543 | 7/2002 |
| JP | 2006-178936 | 7/2006 |
| JP | 2009-253811 | 10/2009 |
| WO | WO 2008/008401 A2 | 1/2008 |
| WO | WO 2012/170709 | 12/2012 |
| WO | WO 2013/016567 A2 | 1/2013 |
| WO | WO 2013/016567 A3 | 4/2013 |

OTHER PUBLICATIONS

"MountVHD Function," Microsoft Corporation, 2007, http://msdn2.microsoft.com/en-us/library/bb309135.aspx.

"Universal Command Guide for Operating Systems," Tom's Hardware, http://www.tomshardware.com/ucg/commands/vmmount-14339.html.

Jiang, et al., "Stealthy Malware Detection Through VMM-Based 'Out-of-the-Box' Semantic View Reconstruction," CCS '07, Oct. 29-Nov. 2, 2007, copyright 2007 ACM 978-1-59593-703-Feb. 7, 2011.

Murray, James D., "Making Hash Sets from VMware Virtual Machines," Jan. 19, 2011, http://www.techexams.net/blogs/jdmurray/making-hash-sets-from-vmware-virtual-machines/, printed Jul. 24, 2011.

Revisit—Improved Support for Application White Listing (AppLocker for Windows 7), VMware ThinApp Blog, Apr. 16, 2010, copyright 2011, VMware, Inc., http://www.techexams.net/blogs/jdmurray/making-hash-sets-from-vmware-virtual-machines/.

VMware VMsafe™ Partner Program, http://www.vmware.com/technical-resources/security/vmsafe/security technology.html, copyright 2011, VMware, Inc., printed Jul. 28, 2011.

Notification of Transmittal of the International Search Report and the Written Opinion of the International Searching Authority, or the Declaration, International Application No. PCT/US2012/041384, dated Dec. 6, 2012, 9 pages.

Notification of Transmittal of the International Search Report and the Written Opinion of the International Searching Authority, or the Declaration, International Application No. PCT/US2012/048386, dated Feb. 13, 2013, 9 pages.

USPTO May 17, 2013 Nonfinal Office Action from U.S. Appl. No. 13/192,412.

Fernandes, Victor, "WindowSecurity.com: Proxy Instalation." http://www.windosecurity.com/whitepapers/Proxy_installation_.html (1 of 12), Feb. 7, 2007.

Pfaff et al., Virtualization Aware File Systems: Getting Beyond the Limitations of Virtual Disks. [online] (Jul. 20, 2006) ACM, pp. 1-14, Retrieved from the Internet http://dl.acm.org/citation.cfm?id=1267706.

USPTO Sep. 12, 2013 Nonfinal Office Action from U.S. Appl. No. 13/155,572.

USPTO Dec. 12, 2013 Response to Sep. 12, 2013 Nonfinal Office Action from U.S. Appl. No. 13/155,572.

(56) References Cited

OTHER PUBLICATIONS

International Preliminary Report on Patentability in International Application No. PCT/US2012/041384, dated Dec. 10, 2013, 9 pages.
USPTO Nov. 20, 2013 Final Office Action from U.S. Appl. No. 13/192,412, 7 pages.
USPTO Apr. 11, 2014 Final Office Action from U.S. Appl. No. 13/155,572.
International Preliminary Report on Patentability received for PCT Application No. PCT/US2012/048386, dated Jan. 28, 2014, 9 pages.
Koichi Onoue, Controlling Processes in Virtual Machines by Virtual Machine Monitor, Information Processing Society of Japan Technical Report, vol. 2007 No. 83, IPSJ, Aug. 3, 2007, pp. 31-38, 11 pages.
Sep. 24, 2014 Nonfinal Notice of Reasons for Rejection in Japanese Patent Application No. 2014-514848, 2 pages of office action, 2 pages of translation.
USPTO Oct. 10, 2014 Nonfinal Office Action from U.S. Appl. No. 13/192,412, 7 pages.
USPTO Nov. 6, 2014 Nonfinal Office Action from U.S. Appl. No. 13/155,572.
Oct. 2, 2014 Extended European Search Report in Application No. 12796800.6-1954/2718867, 8 pages.
Nance, K., et al., "Virtual Machine Introspection: Observation or Interference?", Security & Privacy, IEEE, IEEE Service Center, Los Alamitos,, CA, US, vol. 6, No. 5, Sep. 1, 2008, pp. 32-37, 6 pages.
Payne, Brian D., et al., "Lares: An Architecture for Secure Active Monitoring Using Virtualization," 2008 IEEE Symposium on Security and Privacy, IEEE, Piscataway, NJ, USA, May 18, 2008, pp. 233-247, 16 pages.
Jan. 21, 2015 Office Action in KR Application No. 10-2013-7033671, English translation, 6 pages.
USPTO Mar. 30, 2015 Final Office Action from U.S. Appl. No. 13/192,412, 8 pages.
Riemersma, Thiadmer "Rebasing Win32 DLLs,", Dec. 1, 2000, http://www.drdobbs.com/rebasing-win32-dlls/184416272, 10 pages.
Nonfinal Notice of Reasons for Rejection in Japanese Patent Application No. 2014-514848, dated Jun. 2, 2015, English translation, 2 pages.
Litty, Lionel, et al., "Manitou: A Layer-Below Approach to Fighting Malware," Proceedings of the 1st Workshop on Architectural and System Support for Improving Software Dependability, ASID, '06, pp. 6-11, 6 pages.
USPTO Jun. 16, 2015 Notice of Allowance from U.S. Appl. No. 13/155,572, 11 pages.
Office Action in Korean Application No. 10-2013-7033671, dated Jul. 30, 2015, English translation, 5 pages.
Supplementary European Search Report in EP Application No. EP 12 81 6928, dated Mar. 6, 2015, 8 pages.
USPTO Oct. 6, 2015 Corrected Notice of Allowability from U.S. Appl. No. 13/155,572, 3 pages.
Office Action in CN Application No. 201280028185.6, dated Sep. 25, 2015, English translation, 13 pages.
USPTO Nov. 20, 2015 Notice of Allowance from U.S. Appl. No. 13/155,572, 12 pages.
Onoue, Koichi, et al., "Control of System Calls from Outside of Virtual Machines," Mar. 2008, pp. 2116-2121, http://citeseerx.ist.psu.edu/viewdoc/download;jessionid::2B59482B90 A7ABB63D47CFBE22CA8?doi=10.1.11.153.7783&rep=rep1 &type=pdf , 6 pages.
USPTO Nov. 30, 2015 Notice of Allowance from U.S. Appl. No. 13/192,412, 11 pages.
Second Office Action in CN Application No. 201280028185.6, dated Apr. 25, 2016, English translation, 4 pages.
Third Office Action in CN Application No. 201280028185.6, dated Jul. 29, 2016, with English translation, 4 pages.

* cited by examiner

SYSTEM AND METHOD FOR VIRTUAL PARTITION MONITORING

CROSS-REFERENCE TO RELATED APPLICATION

This Application is a continuation (and claims the benefit of priority under 35 U.S.C. § 120) of U.S. application Ser. No. 13/155,572, filed Jun. 8, 2011, entitled "SYSTEM AND METHOD FOR VIRTUAL PARTITION MONITORING," Inventors Gregory W. Dalcher et al. The disclosure of the prior application is considered part of (and is incorporated in its entirety by reference in) the disclosure of this application.

TECHNICAL FIELD

This specification relates in general to information technology security, and more particularly, to a system and method for virtual partition monitoring.

BACKGROUND

The evolution of virtualization techniques in information technology has led to a variety of applications, from cloud-based computing to embedded systems in mobile phones. In general, virtualization obscures hardware characteristics of a computing platform and instead presents an abstract platform that can host other platforms, including complete operating systems. One popular virtualization technique is to deploy a hypervisor (also known as a virtual machine manager) that can allow guest software (including complete operating systems) to run concurrently on an abstract host platform. The hypervisor can provide a simulated computing environment, often referred to as a "virtual machine," for its guest software. Thus, multiple disparate operating systems can run under a hypervisor on a single chassis, for example.

However, virtual machines are likely to become more popular targets for malicious attacks as the number of deployed virtual machines increases. And while virtualization provides many advantages, it can also present unique security challenges. For example, external security software can monitor events in a virtual machine, such as monitoring memory for read, write, or execute access, but there may be a substantial challenge in understanding the context of such events. Without adequate understanding of the event context, security actions may be significantly limited. Hence, many challenges remain for providing a secure virtualization platform.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment that includes receiving in an external handler an event notification associated with an event in a virtual partition. A thread in the process in the virtual partition that caused the event can be parked. Other threads and processes may be allowed to resume while a security handler evaluates the event for potential threats. A helper agent within the virtual partition may be instructed to execute a task, such as collecting and assembling event context within the virtual partition, and results based on the task can be returned to the external handler. A policy action can be taken based on the results returned by the helper agent, which may include, for example, instructing the helper agent to terminate the process that caused the event.

In more particular embodiments, the external handler may operate in a second virtual partition, in a virtualization host, or as a hypervisor extension, for example. The virtual partitions may be virtualization guests in a virtualized platform, such as an instance of a virtual machine, and the event notification can be sent by a hypervisor extension to the security handler.

Example Embodiments

Figure 1:
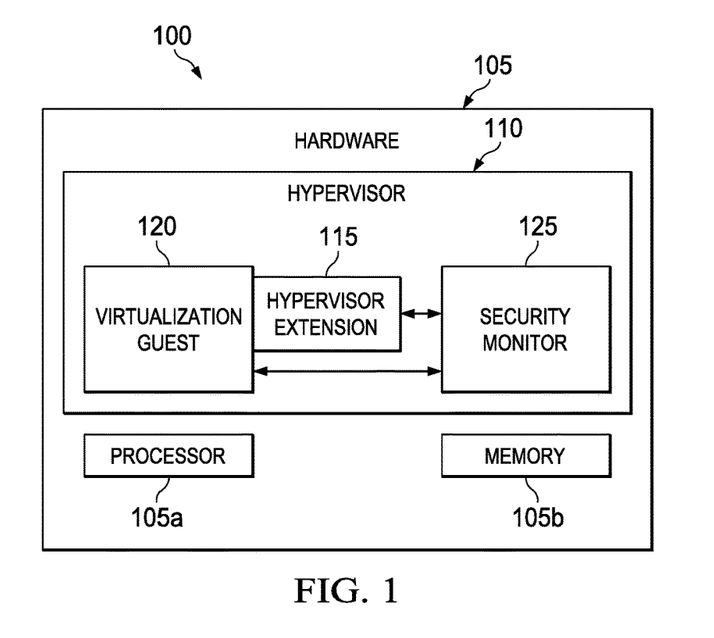
FIG. 1 is a simplified block diagram illustrating an example embodiment of a virtualized platform in which virtual partitions may be monitored in accordance with this specification.

Turning to FIG. 1, FIG. 1 is a simplified block diagram illustrating an example embodiment of a virtualized platform 100 in which virtual partitions may be monitored in accordance with this specification. Virtualized platform 100 includes hardware 105, a hypervisor 110, and a hypervisor extension module 115. In general, hardware 105 represents any machine or apparatus that is capable of accepting, performing logic operations on, storing, or displaying data, and may include without limitation a processor 105*a* and memory 105*b*. Virtualized platform 100 may have more than one virtual partition, such as a virtualization guest 120 and a security monitor 125. In some embodiments, hypervisor 110 may be a native or "bare metal" hypervisor that runs directly on hardware 105 (as illustrated in FIG. 1), but may alternatively run under host software (e.g., a virtualization host) executing on hardware 105. Security monitor 125 may communicate with hypervisor extension 120 through a registered callback, for example, as well as directly with helper agent 210 (i.e., bypassing hypervisor extension 120) through network communications, for example.

In general, a virtual partition may be an instance of a virtual machine, sandbox, container, or any other isolated environment, which can have software running within it. The software may include operating system and application software. To all software running within a virtual partition, though, the virtual partition may appear to be a distinct physical machine.

For purposes of illustrating the principles of monitoring virtual partitions in a virtualized platform such as platform 100, it is important to understand the activities and communications occurring within such a platform. The following foundational information may be viewed as a basis from which the present disclosure may be properly explained. Such information is offered earnestly for purposes of explanation only and, accordingly, should not be construed in any way to limit the broad scope of the present disclosure and its potential applications.

Processes typically operate with constantly changing contexts (or states), such as data in process registers, control registers, memory, tables, or lists. As used herein, the term "process" is used in a broad sense to refer generically to a process, application, thread, task, instruction set, code block, or other similar operating unit. What constitutes context may depend on underlying hardware and operating system software, but in general, context includes a minimal set of data required to resume execution if a process is interrupted. However, it can also refer to any information that may be useful in understanding the environment or circumstances of an intercepted event. Context data of one process may be readily available to other processes within a single operating environment, including processes within a virtual partition, but may difficult to access from outside the operating environment of the process, such as from a process in another virtual partition on the same virtual platform.

Hypervisor extensions, central processing unit extensions, chipset extensions, and the like, can be used to facilitate enhanced monitoring of processes with different contexts. For example, hypervisor extensions can provide enhanced monitoring of virtualization guests, such as monitoring memory for read, write, or execute access, from an external context, such as from a second virtualization guest acting as a security monitor.

An extension set may also support monitoring of other types of events, including other types of memory access or changes to memory attributes, such as making a region writable or executable. Execution of specific CPU instructions or instruction types can also be monitored, such as a CPU "CALL" or "RET" instruction. Monitoring may also be more targeted, such as for events triggered by a specific process, code within a specific region (or regions), execution of a specified address, writing to a specified address, CPU registry changes, or CPU ring state change.

Assembling context information may include, for example, enumerating modules (e.g., dynamic-link libraries or "DLLs") loaded within a process that triggered an intercepted event. Within a guest operating system, such an enumeration can be trivial as it is likely supported by a set of application programming interfaces (APIs) of the operating system. Enumerating modules externally to the guest operating system, however, can require traipsing through a series of internal operating system structures to find the modules.

Templates for structures internal to a guest operating system can be maintained to provide some context, but maintaining versions of these templates for each guest operating system version can be extremely burdensome. Moreover, documentation of some systems, such as Microsoft Windows, may not be available, which can add to the burden.

Monitoring supported by an extension set, such as a hypervisor extension, can include callbacks to registered handlers or agents. Thus, if access is detected within a monitored memory region, for example, the event can trigger a registered callback with the event context. A callback may take place prior to or after event completion. A process that caused the event may be suspended while a callback is made, or a callback may be asynchronous to event completion. Information passed to the callback may include event context, such as the identity of the target of the event (e.g., the memory region being accessed) and the execution component (e.g., process) that triggered the event (e.g., a process identifier, thread, or code location).

In general, monitoring of a virtualization partition can be classified into two categories: (1) internal event handling and (2) external event handling. In internal event handling, notification concerning an event in a virtual partition, such as accessing monitored memory, is sent to a handler within the same virtual partition as the event that triggered the notification. In contrast, external monitoring of a virtual partition provides notification of an event in the monitored virtual partition to a handler executing outside of the monitored virtual partition. The handler may run within a virtualization host (if there is one), a hypervisor, or within a separate virtual partition. Current hypervisor extensions may require a handler to execute outside the monitored memory, within another virtualization guest functioning as a security monitor, for example.

However, if a handler executes outside of the monitored virtual partition, understanding the context of the intercepted event may present a substantial challenge. Without access to event context, it can be difficult to make security decisions about the legitimacy of the intercepted event. Thus, using external delivery of virtualized partition monitoring while providing for full context of the origins of an intercepted event can provide significant value.

In addition to the challenges of assembling context information for an event, delivering the monitoring events to registered callbacks executing outside of a virtual partition can introduce further problems. With this mode of event delivery, for example, a virtual processor of the virtual partition that triggered the monitoring event can be completely halted while the externally executing callback handler processes the event. Unless there are more virtual processors available, no other activity within the virtual partition may occur. Even if there are other virtual processors, the entire virtual partition can still be halted if these also trigger monitoring events. Thus, this type of delivery can introduce a performance penalty for hypervisor-based monitoring and also prevent a virtualization guest from assisting an external callback handler, such as with the discovery of context information.

External event handlers can provide several advantages over internal event handlers. These advantages can include protecting the event handler and associated decision-makers from direct attack by malware executing within a monitored virtual partition. Other advantages include agent-less security where a virtual partition may be protected without deploying a security agent within it. Accordingly, the value of external delivery of virtual partition monitoring could be significantly enhanced if a more complete context of the origins of intercepted operations could be provided without the numerous problems that typically accompany external event handlers as described herein.

In accordance with embodiments described herein, virtualization platform 100 can overcome these shortcomings (and others) while preserving advantages of external event handling by providing external monitoring without requiring an understanding of internal operating system structures. Virtualization platform 100 may, for example, provide hybrid virtual partition monitoring with an external handler that can receive notification of events intercepted within a monitored virtual partition, such as a monitored virtualization guest running under a hypervisor. An internal helper agent deployed within the virtual partition can perform certain tasks on behalf of the external handler, which may include assembling context information associated with an intercepted event and providing the results to the external handler. An internal helper agent may include a component that resides within a monitored process, as well as a component that may execute separately. An external handler can use information and activities of an internal agent to guide policy decisions, such as blocking an event and terminating the event process or thread if it violates a security policy. In some embodiments, an external handler may direct that an internal agent implement certain policy actions.

In some embodiments of virtualization platform 100, operations associated with an intercepted event in a virtual partition may be parked or suspended within the virtual partition while the event is evaluated, which can allow other processes and threads to execute in the virtual partition. Suspending associated operations can minimize performance impacts on the virtual partition and also allow an internal agent to run within the virtual partition to execute tasks for an external handler. Moreover, these tasks can be performed in a thread different from the thread that originated the intercepted event, thereby reducing risks of interoperability and deadlock issues.

In more particular embodiments, an external security handler or agent may register with an extended hypervisor to receive notification of an event in a virtualization guest. A helper agent running within the virtualization guest can create threads that wait to receive task requests from the security handler. The helper agent may also create a memory region within a monitored process to contain data used to communicate with the security handler and code that the security handler can control. In response to an event interception, a security handler can put the event-triggering thread in a holding state and initiate tasks for a helper agent to perform within the monitored virtualization guest.

Figure 2:
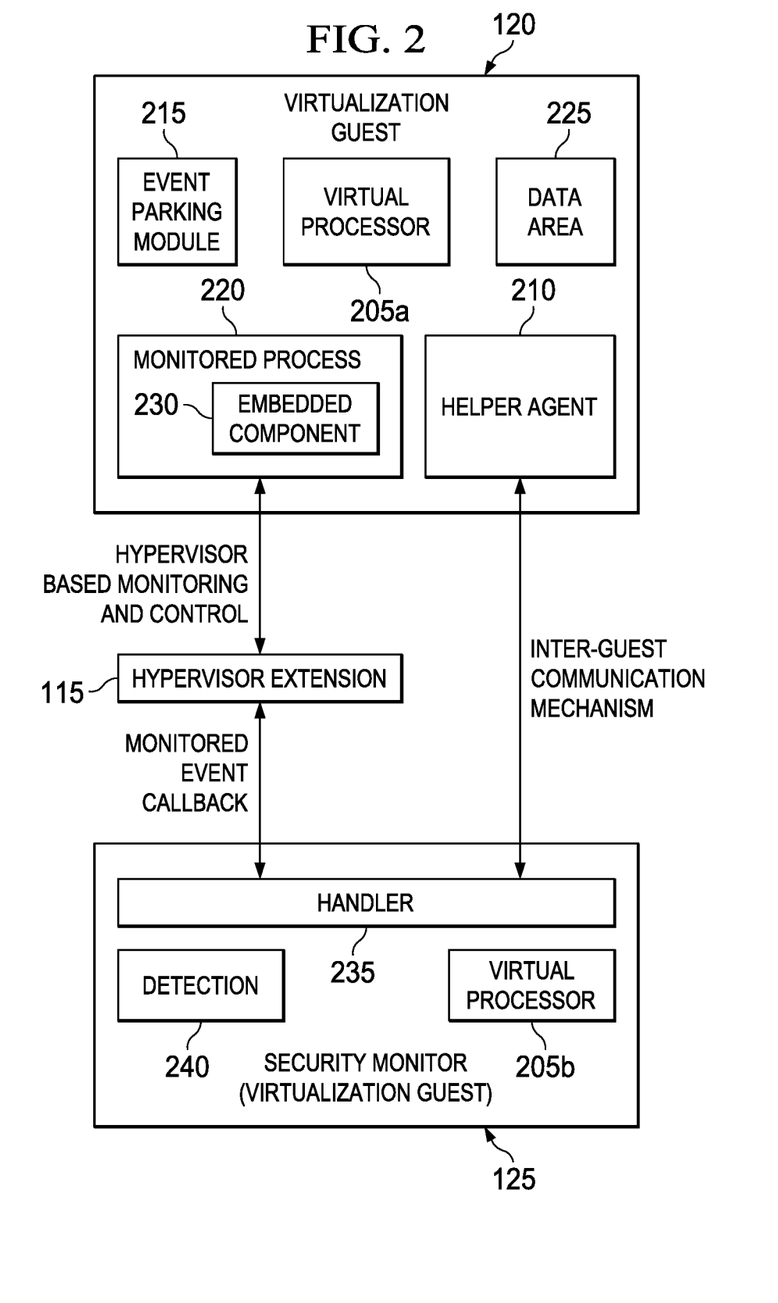
FIG. 2 is a simplified block diagram illustrating additional details that may be associated with one potential embodiment of the virtual platform.

Turning to FIG. 2, FIG. 2 is a simplified block diagram illustrating additional details that may be associated with one potential embodiment of virtual platform 100. FIG. 2 includes hypervisor extension module 115, virtualization guest 120, and security monitor 125. Security monitor 125 also may be a virtualization guest within hypervisor 110, particularly a trusted guest with additional privileges. Virtualization guest 120 and security monitor 125 each may include a respective virtual processor 205*a-b*, a respective memory element 205*a-b*, and various software elements (including distinct operating systems in certain embodiments). More particularly, virtualization guest 120 may include a helper agent 210, event parking module 215, and a monitored process 220. A data area 225 may be used to communicate with event parking module 215. An embedded component 230 of helper agent 210 may also reside in monitored process 220. Security monitor 125 may have a security handler 235 and a detection module 240. Hypervisor extension 115 may provide monitoring and execution control over monitored process 220, and event callback to security monitor 125 if an event triggers a notification. An intra-guest communication mechanism may enable direct communication between helper agent 210 and security handler 235.

In alternative embodiments, security monitor 125 (including handler 235 and detection module 240) may reside within hypervisor 110 (outside of a virtual partition) or as a hypervisor extension. In yet other embodiments, security monitor 125 may operate within the execution environment of a host operating system if, for example, hypervisor 110 is not an embedded hypervisor.

In regards to the internal structure associated with virtual platform 100, hardware 105 can include memory elements (as shown in FIG. 1) for storing information to be used in the operations outlined herein. Additionally, virtual platform 100 may include a processor and one or more virtual processors that can execute software or an algorithm to perform activities as discussed herein. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein should be construed as being encompassed within the broad term 'memory element.' The information being tracked or sent by hypervisor 110, hypervisor extension 115, virtualization guest 120, or security monitor 235 could be provided in any database, register, control list, or storage structure, all of which can be referenced at any suitable timeframe. Any such storage options may be included within the broad term 'memory element' as used herein. Similarly, any of the potential processing elements, modules, and machines described herein should be construed as being encompassed within the broad term 'processor.'

Note that in certain example implementations, the functions outlined herein may be implemented by logic encoded in one or more tangible, non-transitory media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 1) can store data used for the operations described herein. This includes the memory element being able to store software, logic, code, or processor instructions that are executed to carry out the activities described herein. A processor can execute any type of instructions associated with the data to achieve the operations detailed herein. In one example, a processor (as shown in FIG. 1) or a virtual processor (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Figure 3A:
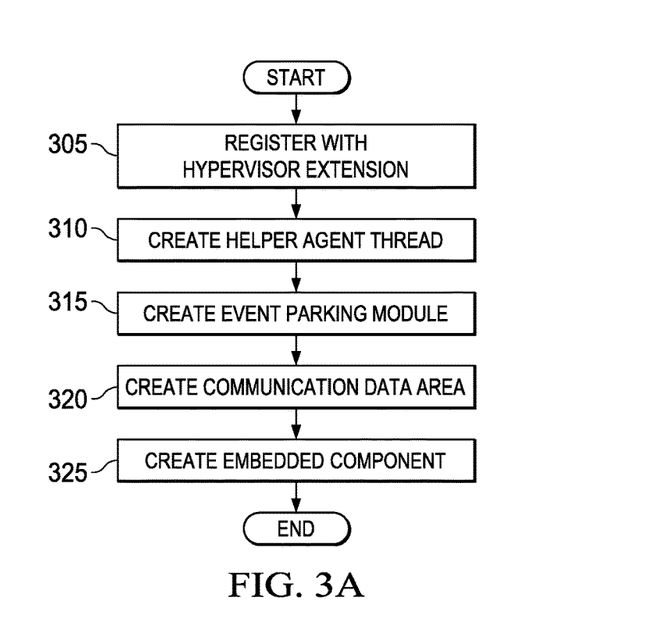
FIGS. 3A-3B are simplified flowcharts illustrating potential operations that may be associated with one embodiment of the virtual platform.
Figure 3B:
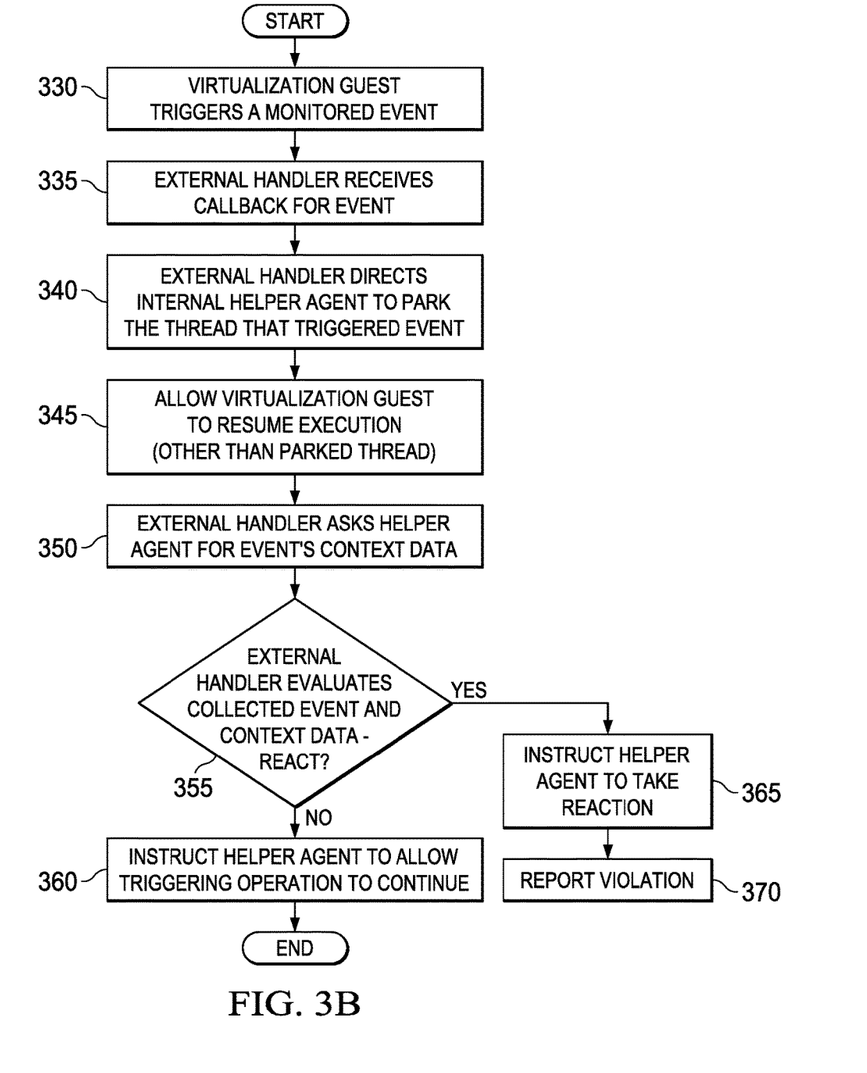

FIGS. 3A-3B are simplified flowcharts illustrating potential operations that may be associated with one embodiment of virtual platform 100. More particularly, FIG. 3A illustrates preliminary operations that may be used to configure virtual platform 100, and FIG. 3B illustrates potential operations associated with evaluating and acting on an event.

Turning to FIG. 3A, security monitor 125 may register with hypervisor extension 115 at 305 to receive an event notification (e.g., a callback) for a specified event. Additionally, helper agent 210 may create a thread at 310 that waits for a task request from a handler, such as a request via network communication from handler 235. Event parking module 215 and data area 225 may also be created at 315 and 320. Event parking module 215 can wait for an operating system supported signaling mechanism, for example.

An embedded component, such as embedded component 230, may also be created within each monitored process at 325, including a memory region that resides within the address space of each monitored process. For example, code injection may be used to insert executable code into a running process, which may include loading executable modules (such as DLLs) into the process. Typically, the first step for injection is to gain sufficient access to a process to allow creation of memory regions where injected code can be placed and executed. An access token may often be obtained to gain access to a running process. The access token may include privileges to allocate memory within the process, write to that memory, and change attributes of the memory (e.g., to allow for execution). Once access to a process has been obtained, memory can be created within that process. Code may be written to that memory and attributes set to allow for execution from within the memory. In other embodiments, an operating system may provide a mechanism for specifying that a process should load a module into each instance. For example, the "rundll" registry key in Windows operating systems can cause processes to load all modules listed in the key.

The injected code may then be executed. If a module is loaded on process start, the injected code may have executed when the module was loaded. DLLs can execute code within their "dllmain" export in Windows, for example. Alternatively, injected code may be initiated by creating a new thread within the process to execute code in the injected memory region. Code hooking may also be used to redirect execution to injected code. Code hooking can cause execution of code within a process to branch to code within the injected memory region. For example, instructions at the start of an interface may be replaced with a "jump" instruction that can transfer execution into injected code. Using code injection and code hooking can enable enhanced monitoring of operations in a process that may not otherwise be possible.

Turning to FIG. 3B, a process (such as process 220) may trigger a monitored event and callback from hypervisor extension 115 at 330, such as by attempting to access a memory region for which security monitor 125 registered to receive callbacks. Security handler 235 can receive the callback with event data at 335 and use hypervisor extension 115 to direct virtual processor 205a to execute event parking module 215 at 340. The callback can be completed and virtualization guest 120 returned to a running state so that only process 220 is parked. Since it does not use a busy loop, the rest of the system may continue to run normally, which can allow helper agent 210 to execute.

The event may be identified in data area 225, for example, and event parking module 215 may perform a task communicated via embedded component 230. The task may include, for example, setting an instruction pointer and stack to a certain value to implement a control transfer. The task may also include setting any other register to a value, such as to set a return value for an API. Thus, helper agent 210 can provide a mechanism to park a thread or process that has triggered a callback, and allow a thread to carry out a task on behalf of security handler 235 using mechanisms available within virtualization guest 120, such as APIs provided by a guest operating system, which can significantly increase stability and compatibility. Virtualization guest may resume execution of other processes, threads, etc. at 345.

Security handler 235 may send a task request to helper agent 210 (e.g., via intra-guest communication mechanism) at 350. Helper agent 210 (or a thread within helper agent 210) may receive the request and retrieve a data payload from the request. The data payload may include a description of a task to execute, such as enumerating all modules (e.g., DLLs) loaded within a process. Thus, security handler 235 may request context data for an event at 350, for example. Examples of context data may include information about a process that triggered an event, the type of action that triggered the event (e.g., write access to a specific memory region), a process that owned a specific memory region that was accessed, or details about a file operation (e.g., file size, name, modification date, etc). Helper agent 210 can carry out the described task and return any results to security handler 235, such as returning context data for process 220 at 355.

Based on context data and event data, detection module 240 can determine if the event is malicious or otherwise violates a security policy. If no security policy is violated, security handler 235 may use hypervisor extension 115 to allow process 220 to continue at 360, such as by resetting virtual processor 205a's instruction pointer to resume execution from the point where the triggering event occurred. Resetting the instruction pointer may minimize problems that might otherwise be encountered if process 220 were operated as a normal thread. Alternatively, data area 225 may be set with a command to set the instruction pointer and stack pointer back to values that return execution to the point where the triggering event occurred.

If, however, detection module 240 identifies a security policy violation at 355, security handler 235 can instruct helper agent 210 to implement action at 365, such as blocking process 220 from further execution. An action may be carried out by either helper agent 210 or embedded component 230. For example, blocking a triggering operation may be best performed by embedded component 230, while terminating monitored process 220 may be best performed by helper agent 210 (executing externally to monitored process 220). Event parking module 215 may also implement action, depending upon the type of action. If an action is asynchronous, such as terminating a process, security handler 235 can communicate this to helper agent 210 and conclude processing of the triggering event. If an action is synchronous, the action may be indicated in data area 255, for example, to signal helper agent 210, and then processing of the monitored event may be concluded. The violation may also be recorded in a log or reported to an administrator via email, for example, at 370.

It is important to note that the steps in the appended diagrams illustrate only some of the possible scenarios and patterns that may be executed by, or within, virtual platform 100. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by virtual platform 100 in that any suitable arrangements, chronologies, configurations, and timing mechanisms may be provided without departing from the teachings provided herein.

Moreover, the principles described herein are readily applicable to other monitoring systems in which a callback or other event notification may be delivered from a guest or specialized container to a handler having a different context, such as for document control, auditing, forensics, and performance monitoring, for example.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. At least one non-transitory machine readable medium including code for execution that, when executed by one or more processors, is to:
use an access code to gain access to a monitored process in a virtual partition of a virtualized platform;
create a memory region within the monitored process;
insert an embedded component into the memory region;
send, to an external handler configured to operate externally to the virtual partition, an event notification indicating an event associated with the monitored process;
perform a first task communicated by the embedded component in the monitored process to suspend a first thread of the monitored process;
execute, by a second thread in the virtual partition, a second task to identify context information associated with the event;
send, from the virtual partition, the identified context information to be evaluated; and
take an action based, at least in part, on an evaluation of the identified context information.

2. The at least one non-transitory machine readable medium of claim 1, wherein the code, when executed by the one or more processors, is to:
create the embedded component within the monitored process by causing the monitored process to load the embedded component.

3. The at least one non-transitory machine readable medium of claim 1, wherein the code, when executed by the one or more processors, is to:
create, by a helper agent in the virtual partition, one or more threads in the virtual partition to receive communications from the external handler.

4. The at least one non-transitory machine readable medium of claim 1, wherein the code, when executed by the one or more processors, is to:
perform the first task responsive to receiving instructions from the external handler after the event notification is sent to the external handler.

5. The at least one non-transitory machine readable medium of claim 1, wherein the code, when executed by the one or more processors, is to:
evaluate the event externally to the virtual partition to determine whether the event violates at least one of one or more security policies based on the identified context information; and
responsive to the evaluation, provide an instruction to a helper agent in the virtual partition, the instruction indicating the action to be taken.

6. The at least one non-transitory machine readable medium of claim 5, wherein, if it is determined that the event violates at least one of the one or more security policies, the action is to block the monitored process from further execution.

7. The at least one non-transitory machine readable medium of claim 5, wherein, if it is determined that the event does not violate the one or more security policies, the action is to resume execution of the monitored process.

8. The at least one non-transitory machine readable medium of claim 1, wherein the context information includes at least one of information about the monitored process, a type of action that triggered the event, a process that owned a specific memory region that was accessed by the monitored process, or details related to a file operation performed by the monitored process.

9. The at least one non-transitory machine readable medium of claim 1, wherein the code, when executed by the one or more processors, is to:
receive, by a helper agent in the virtual partition, a request for the context information, the request sent to the helper agent in response to the event notification.

10. The at least one non-transitory machine readable medium of claim 9, wherein the request is to enumerate all modules loaded within the monitored process.

11. The at least one non-transitory machine readable medium of claim 1, wherein the virtual partition is a first virtualization guest of the virtualized platform, and
wherein the external handler operates in a second virtualization guest in the virtualized platform, in a hypervisor of the virtualized platform, or in a virtualization host of the virtualized platform.

12. The at least one non-transitory machine readable medium of claim 1, wherein the event notification is received by the external handler from a hypervisor extension in the virtualized platform.

13. The at least one non-transitory machine readable medium of claim 1, wherein the code, when executed by the one or more processors, is to:
resume other processes in the virtual partition after suspending the first thread associated with the event.

14. An apparatus, comprising:
one or more hardware processors;
one or more virtual processors configured to execute in a virtual partition of a virtualized platform and to run on the one or more hardware processors;
a helper agent to run on the one or more virtual processors to:
use an access code to gain access to a monitored process in the virtual partition;
create a memory region within the monitored process;
insert an embedded component into the memory region;
a security handler to operate externally to the virtual partition to receive an event notification indicating an event associated with the monitored process;
a module to run on the one or more virtual processors to perform a first task communicated by the embedded component in the monitored process to suspend a first thread of the monitored process,
wherein the helper agent is to run on the one or more virtual processors to further:
cause execution of a second task by a second thread in the virtual partition, the second task to identify context information associated with the event;
send, from the virtual partition, the identified context information to be evaluated; and
take an action based, at least in part, on an evaluation of the identified context information.

15. The apparatus of claim 14, wherein the event is evaluated externally to the virtual partition to determine whether the event violates at least one of one or more security policies based on the identified context information, and
wherein, responsive to the evaluation, an instruction indicating the action to be taken is provided to the helper agent.

16. The apparatus of claim 14, wherein the helper agent is to run on the one or more virtual processors to further:
receive a request for the context information, the request sent to the helper agent in response to the event notification.

17. The apparatus of claim 14, wherein the request is to enumerate all modules loaded within the monitored process.

18. The apparatus of claim 14, wherein the helper agent is to run on the one or more virtual processors to further:
create one or more threads in the virtual partition to receive communications from the external handler.

19. The apparatus of claim 14, wherein the helper agent is to run on the one or more virtual processors to further:
perform the first task responsive to receiving instructions from the external handler, wherein the instructions are received after the event notification is sent to the external handler.

20. The apparatus of claim 14, wherein, if a determination is made that the event violates at least one of one or more security policies, the action is to block the monitored process from further execution.

21. A method, comprising:
creating a memory region within a monitored process in a virtual partition of a virtualized platform, wherein the memory region is created by a helper agent in the virtual partition using an access code to gain access to the monitored process;
inserting an embedded component into the memory region;
sending, to an external handler configured to operate externally to the virtual partition, an event notification indicating an event associated with the monitored process;
performing a first task communicated by the embedded component in the monitored process to suspend a first thread of the monitored process;
executing, by a second thread in the virtual partition, a second task to identify context information associated with the event;
sending, from the virtual partition, the identified context information to be evaluated; and
taking an action based, at least in part, on an evaluation of the identified context information.

22. The method of claim 21, further comprising:
receiving, by the helper agent in the virtual partition, a request for the context information, the request sent to the helper agent in response to the event notification.

23. The method of claim 22, wherein the request is to enumerate all modules loaded within the monitored process.

24. The method of claim 21, further comprising:
receiving, by the helper agent, a request for the context information, wherein the request is to enumerate all modules loaded within the monitored process.

* * * * *

UNITED STATES PATENT AND TRADEMARK OFFICE
CERTIFICATE OF CORRECTION

Page 1 of 1

PATENT NO.        : 10,032,024 B2
APPLICATION NO.   : 15/082060
DATED             : July 24, 2018
INVENTOR(S)       : Gregory W. Dalcher et al.

It is certified that error appears in the above-identified patent and that said Letters Patent is hereby corrected as shown below:

On the Title Page

In item (63), in Column 1, in "Related U.S. Patent Documents", Line 2, delete "92,989,108" and insert -- 9,298,910 --, therefor.

In item (56), in Column 2, under "Other Publications", Lines 2-3, delete "blcndl2.chroot.htm1." and insert -- blcmdl2.chroot.html. --, therefor.

Signed and Sealed this
Eleventh Day of December, 2018

Andrei Iancu
*Director of the United States Patent and Trademark Office*